United States Patent [19]

Arnold

[11] 4,184,805
[45] Jan. 22, 1980

[54] FLUID ENERGY CONVERTING METHOD AND APPARATUS

[76] Inventor: Lee Arnold, 177 E. 77th St., New York, N.Y. 10021

[21] Appl. No.: 884,816

[22] Filed: Mar. 9, 1978

[51] Int. Cl.² .............................................. F03D 5/06
[52] U.S. Cl. ........................................ 416/1; 416/64
[58] Field of Search .................................... 416/64–68

[56] References Cited
U.S. PATENT DOCUMENTS

| | | | |
|---|---|---|---|
| 1,486,040 | 3/1924 | Schieferstein | 416/81 |
| 3,040,976 | 6/1962 | De Mattos | 416/66 X |
| 3,508,840 | 4/1970 | Lederlin | 416/1 |
| 3,783,858 | 1/1974 | Ashikian | 416/83 X |
| 3,995,972 | 12/1976 | Nassar | 416/68 |
| 4,024,409 | 5/1977 | Payne | 416/81 X |

FOREIGN PATENT DOCUMENTS 510435 12/1920 France ........................................ 416/83

Primary Examiner—Everette A. Powell, Jr.
Attorney, Agent, or Firm—Fitzpatrick, Cella, Harper & Scinto

[57] ABSTRACT

There is disclosed a method and apparatus for converting the kinetic energy of a moving fluid stream into useful work by means of a cascade of thin airfoils positioned therein. In one embodiment, the airfoils are provided with at least two degrees of freedom and adjacent airfoils are movable out of phase. The airfoils are subjected to the aerodynamically induced oscillations caused by the aeroelastic phenomenon known as flutter and the oscillatory movement is then harnessed to do useful work. In an alternate embodiment, a cascade of airfoils is mechanically oscillated within a moving fluid stream to increase the propulsion of the fluid. Where the fluid is a liquid, the cascade includes a plurality of hydrofoils.

33 Claims, 16 Drawing Figures

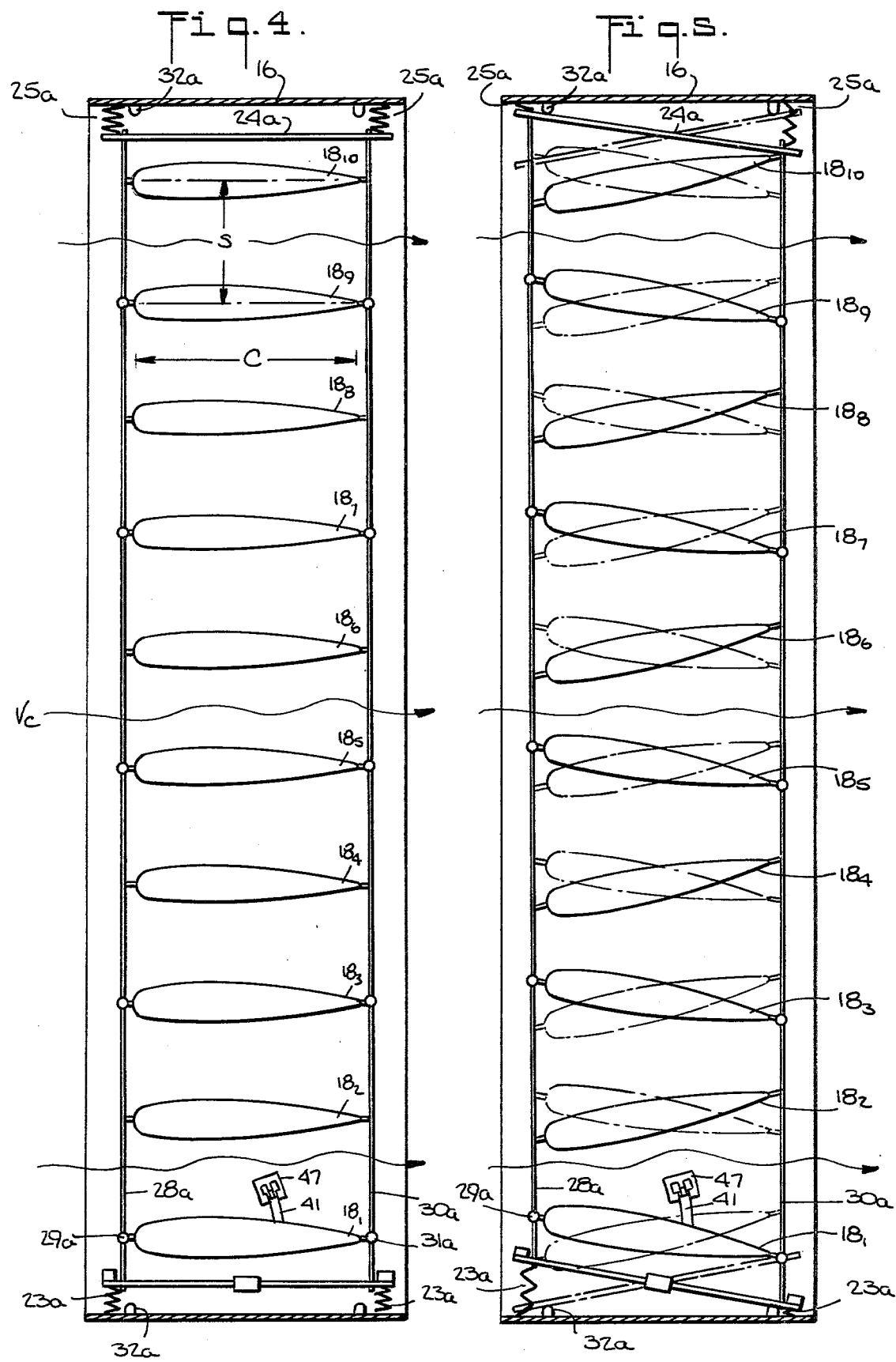

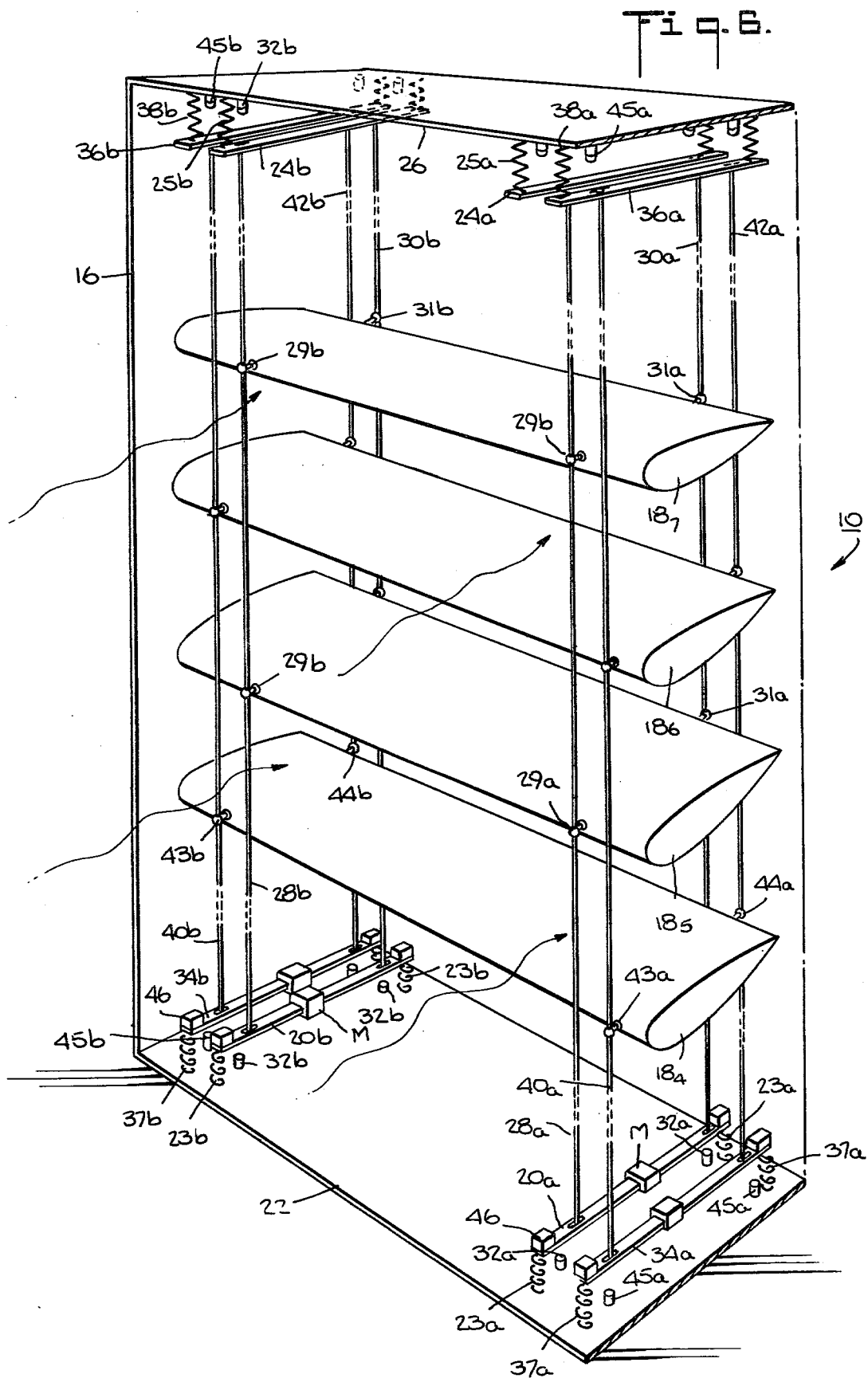

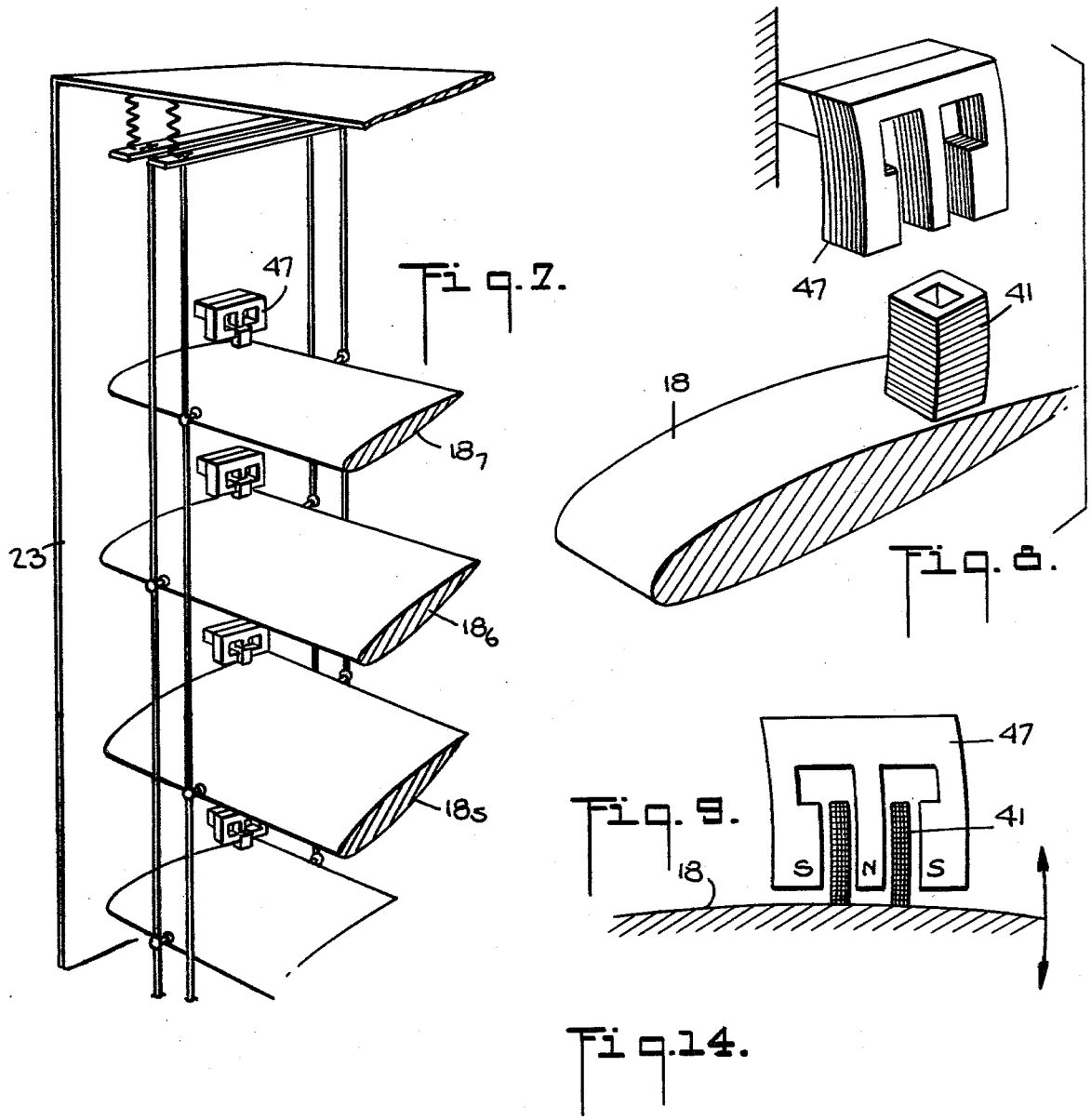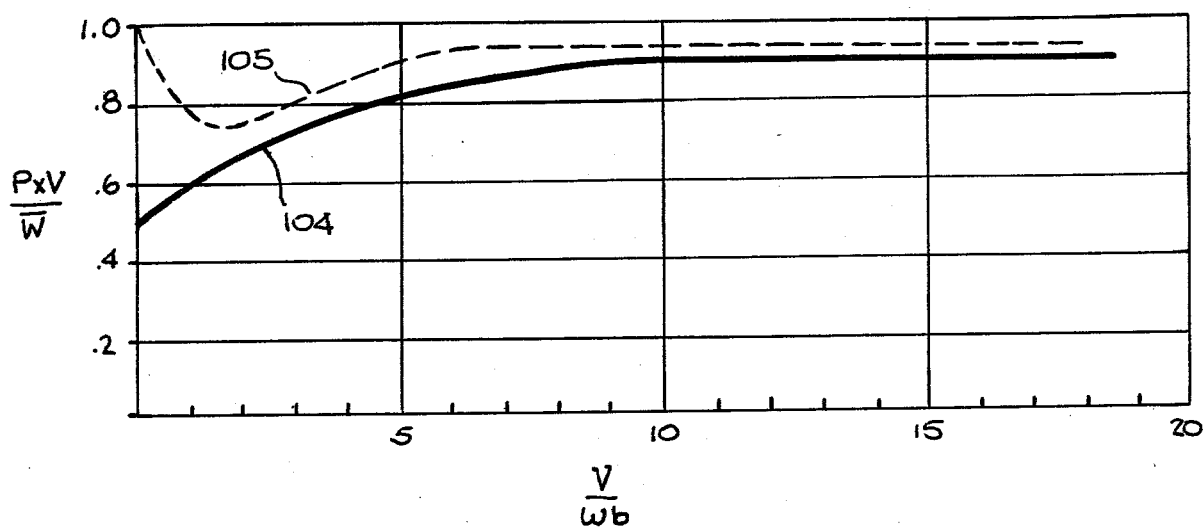

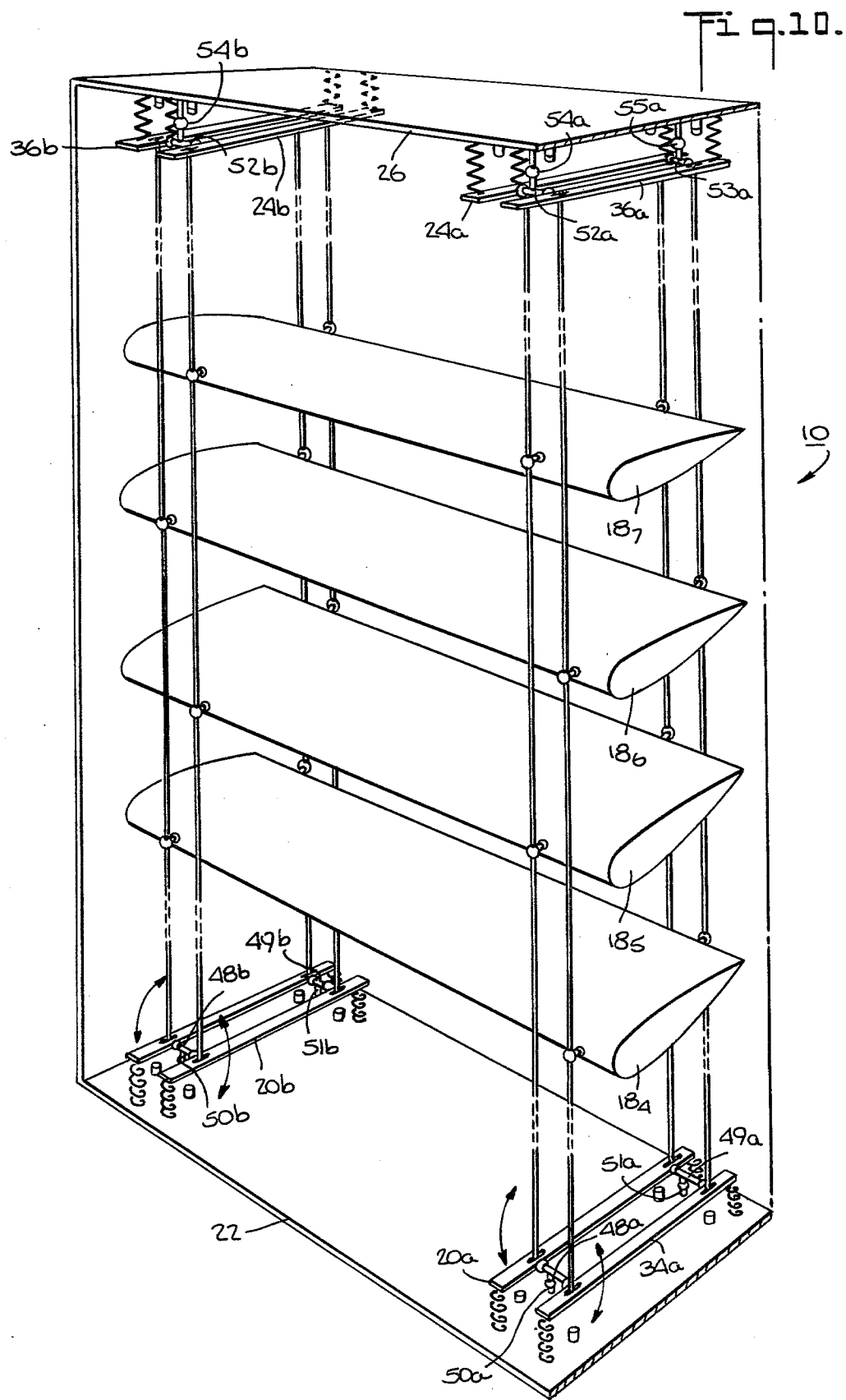

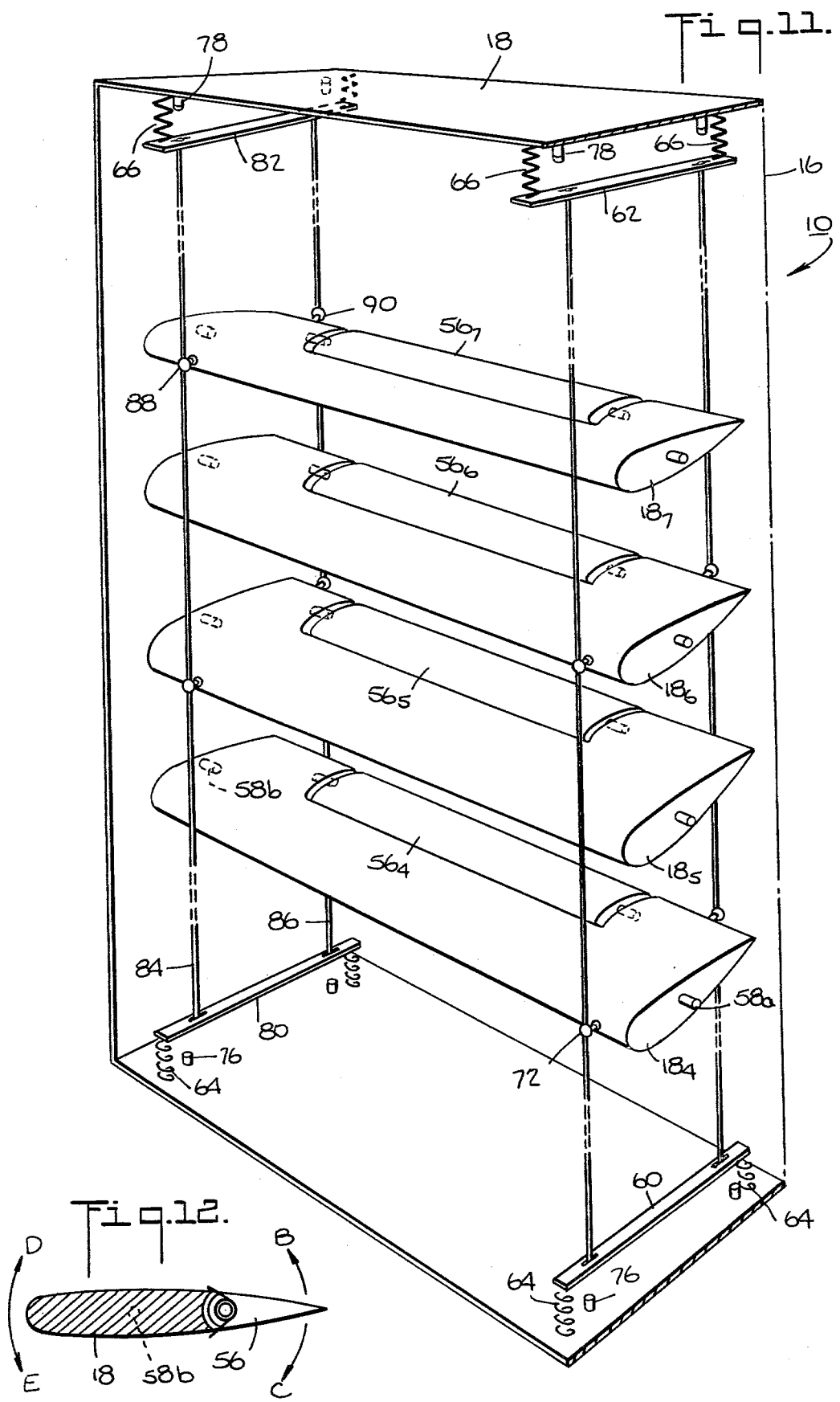

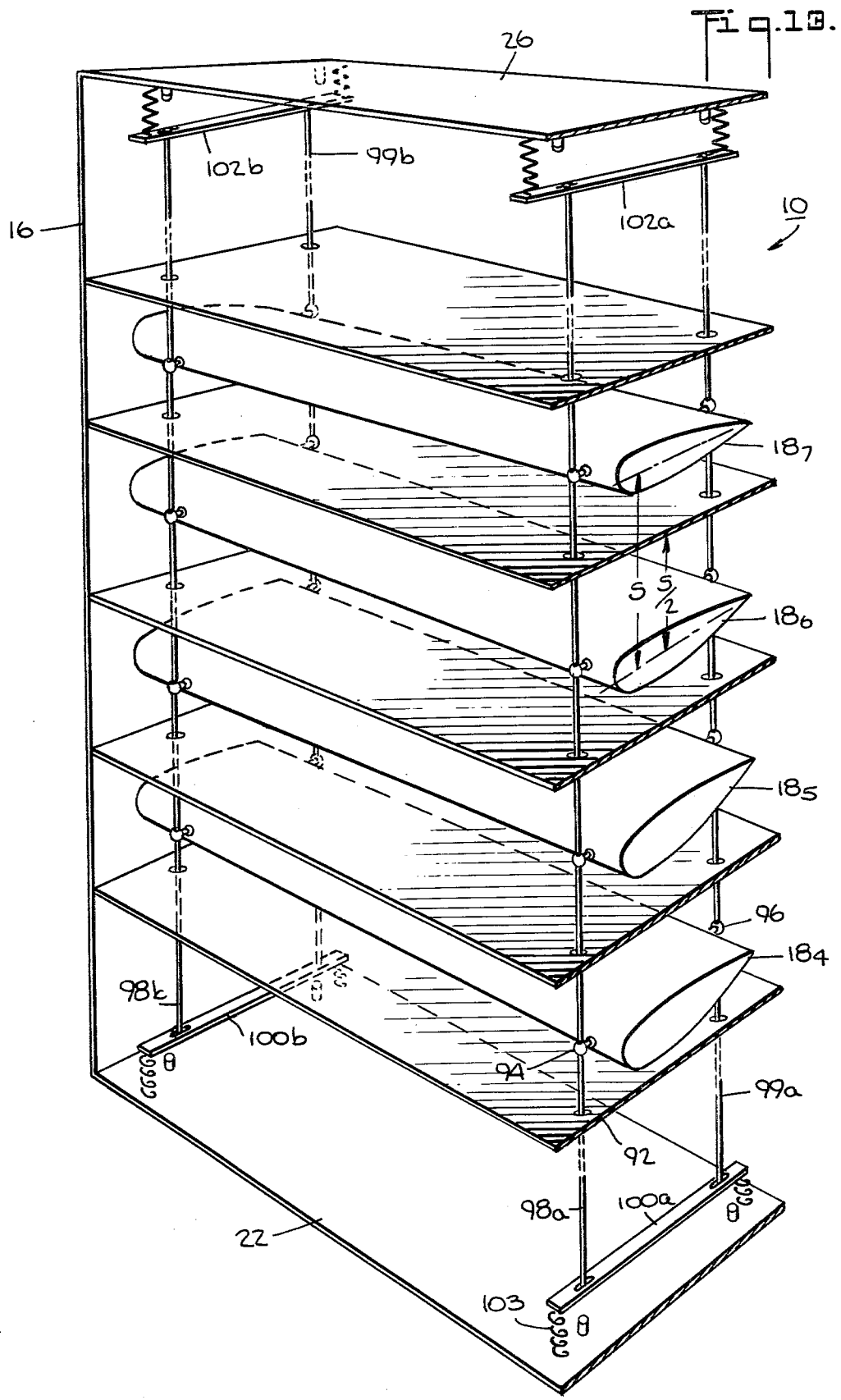

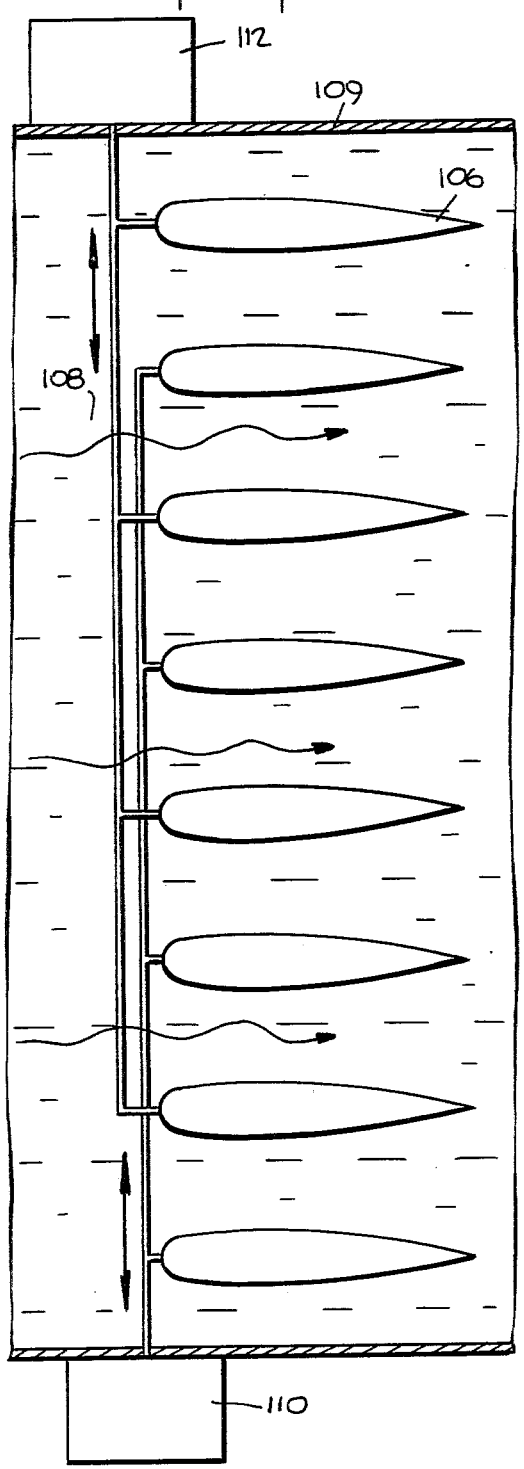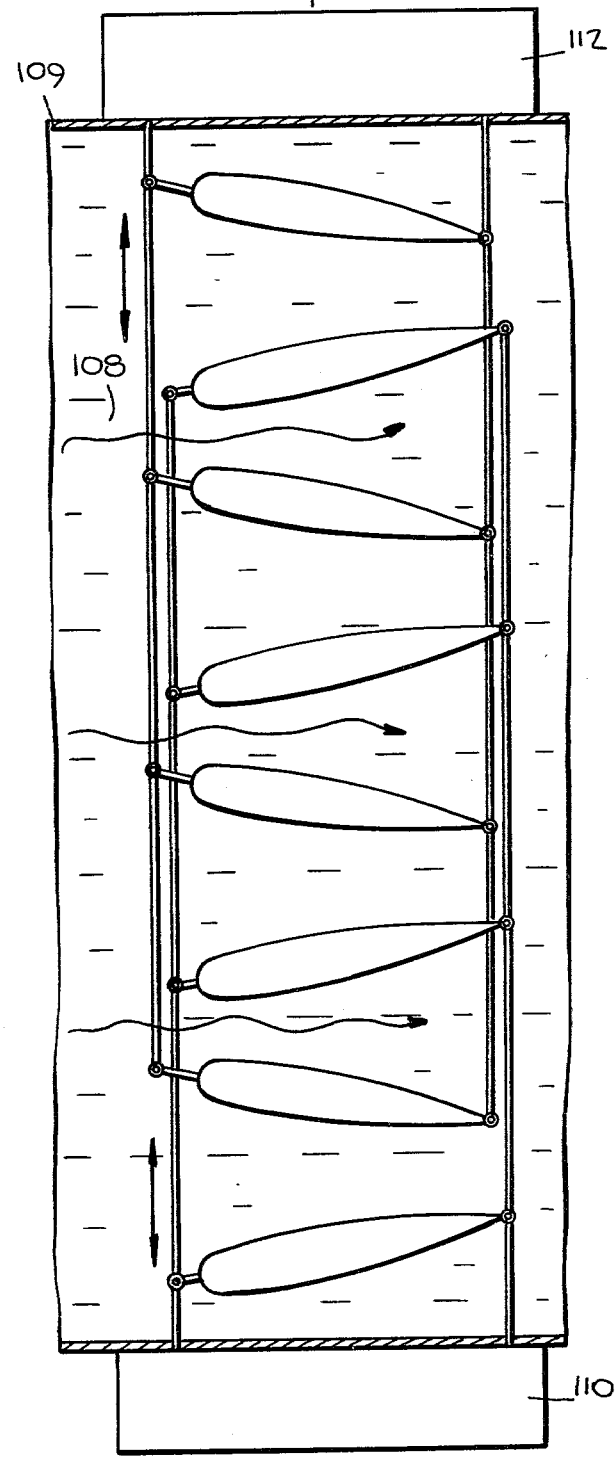

FLUID ENERGY CONVERTING METHOD AND APPARATUS

BACKGROUND OF THE INVENTION

1. Field of the Invention

The present invention relates to techniques and apparatus for harnessing the kinetic energy of a moving fluid stream and more particularly to a cascade of airfoils or hydrofoils oscillating in a fluid stream to produce useful work.

2. Background of the Invention

The recent search for alternate sources of energy has caused a renewed interest in utilizing the inexhaustible kinetic energy of moving fluids such as the wind, streams and even the oceans. While the windmill is the simplest example of a device capable of harnessing such energy, it has limited utility because its size is restricted by the centrifugal forces produced with large rotating blades.

One alternative to the windmill is disclosed in U.S. Pat. No. 4,024,409 to Peter R. Payne. This patent discloses a device including a wire which is oscillated by the shedding of vortices therefrom which oscillations are then converted into useful work. Like the aeolian harp, the Tacoma Narrows Bridge and a street sign flapping in a strong gust of wind, this type of oscillatory movement is induced when vortices are shed from a blunt body at a frequency in resonance with the natural vibration frequency of the object. This patent also discloses the use of a single blade oscillated in response to wind conditions. However, like the windmill, the amount of energy which can be harnessed by such a system is quite limited. Furthermore, such oscillations are due to the Karman vortex street phenomenon rather than the aeroelastic phenomenon of wing flutter.

U.S. Pat. No. 3,995,972 discloses a device including a stack of rigidly interconnected airfoils positioned in the wind. By sequentially varying the angle of attack of the airfoils, uniform oscillatory motion is produced for reciprocating a rod which in turn drives an output device. The disadvantage of this system, like the windmill, is that there is no way to compensate for variations in wind velocity to assure a substantially constant output.

It has also long been known that a great amount of energy is available when an airfoil is subjected to the aeroelastic phenomenon of flutter. However, studies of this phenomenon have been directed solely to preventing its occurrence since, if left uncontrolled, instability and eventual destruction of the airfoil results.

Finally, some work has also been done on the production of negative drag in the case of a single oscillating airfoil. See Garrick, I. E., *Propulsion of a Flapping and Oscillating Airfoil*, NACA Report No. 567, May 1936.

SUMMARY OF THE INVENTION

The present invention avoids the disadvantages of the prior art by means of a novel method and apparatus for effectively harnessing large amounts of the available energy from a moving fluid stream with a cascade of airfoils positioned therein. As used hereinafter, the term airfoil is intended to include a hydrofoil.

According to one aspect of the invention, there is provided a novel method for converting the kinetic energy of a fluid into useful work by positioning a cascade of thin airfoils in a moving fluid stream to define an aerodynamic system. The airfoils are at zero angle of attack when undisturbed and each airfoil has two degrees of freedom while adjacent airfoils are movable out of phase. The system is then adjusted until the velocity of the fluid stream is a critical velocity for the system sufficient to induce flutter oscillations. The airfoils are then disturbed and the resultant oscillations of the airfoils are utilized to produce useful work. Variations in fluid velocity are detected and the system is controlled to maintain critical velocity and steady state oscillations.

According to another aspect of the invention, there is provided apparatus for converting the kinetic energy of a fluid stream into useful work comprising a support structure open at opposite ends to permit fluid flow therethrough, a plurality of thin airfoils and means for mounting the airfoils within the support structure in a cascade and at zero angle of attack when undisturbed. In addition, the airfoils are provided with at least two degrees of freedom with adjacent airfoils movable out of phase. The apparatus further includes means for utilizing the oscillatory movement of the airfoils to produce useful work.

The airfoils are preferably arranged in two subsystems, the airfoils of each subsystem being interconnected to oscillate in phase. The subsystems may be mechanically interconnected to move 180° out of phase or may be interconnected solely with oppositely acting mechanical oscillators which maintain and enhance the flutter oscillations and also provide the initial disturbance of the airfoils within the fluid stream.

A control system may also be provided to maintain the flutter oscillations when the velocity of the fluid varies.

According to a further aspect of the invention, there is provided a method for converting the kinetic energy of a fluid stream into useful work by positioning a device including a pair of parallel plates and a thin airfoil equally spaced from each plate and having at least two degrees of freedom within a moving fluid stream. The plates are positioned parallel to the free stream and the airfoil is at zero angle of attack when undisturbed to define an aerodynamic system. The system is then adjusted until the velocity of the fluid is sufficient to induce flutter oscillations, the airfoil is disturbed and the resultant oscillations are utilized to produce useful work.

According to a still further aspect of the invention, there is provided apparatus for converting the kinetic energy of a fluid stream into useful work comprising a support structure open at opposite ends to permit fluid flow therethrough and including a plurality of equally spaced flat plates extending parallel to the direction of fluid flow, a plurality of airfoils, means for mounting the airfoils within the support structure in a cascade with each airfoil having at least two degrees of freedom and being equally spaced between adjacent flat plates at zero angle of attack when undisturbed, means interconnecting the airfoils to oscillate in phase, and means operatively associated with the airfoils to utilize the oscillatory movement to produce useful work.

According to yet another aspect of the invention, there is provided either a single airfoil in a bounded fluid or a cascade of airfoils in a moving fluid stream. The airfoils are mechanically oscillated to increase the propulsion of the fluid. The mechanical driving means may be of any type including the output from a cascade of airfoils subjected to flutter oscillations.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that this invention may be utilized as a basis for designing other structures or methods for carrying out the several purposes of this invention. It is therefore important that the claims be regarded as including such equivalent constructions and methods as do not depart from the scope of the invention.

BRIEF DESCRIPTION OF THE DRAWINGS

Several embodiments of the invention have been chosen for purposes of illustration and description, as shown in the accompanying drawings forming a part of the specification, wherein:

FIGS. 4 and 5 are section views taken along lines A—A of FIG. 1 illustrating the position of the airfoils subjected to a critical velocity, before and after being disturbed;

FIG. 6 is a partial, schematic perspective view of an energy converter according to FIG. 1, illustrating the mounting of the airfoils according to a first embodiment;

FIGS. 7 and 8 are partial, schematic perspective views of an energy converter according to claim 1, illustrating the incorporation of an electrical network for producing alternating current;

FIG. 9 is a sectional view illustrating the electrical network for producing alternating current;

FIG. 10 is a partial, schematic perspective view illustrating the mounting of the airfoils according to a second embodiment;

FIG. 11 is a partial, schematic perspective view illustrating yet another embodiment of the invention;

FIG. 12 is a section view illustrating an airfoil according to the embodiment of FIG. 11;

FIG. 13 is a partial, schematic perspective view illustrating a further embodiment of the invention;

FIG. 14 is a graph illustrating the increased efficiency achieved by oscillating a cascade of airfoils in a moving fluid stream in order to increase propulsion;

FIG. 15 is a schematic, sectional view of one embodiment of a propulsion device according to the present invention; and FIG. 16 is a schematic, sectional view of another embodiment of a propulsion device.

DETAILED DESCRIPTION OF THE PREFERRED EMBODIMENTS

Figure 1:
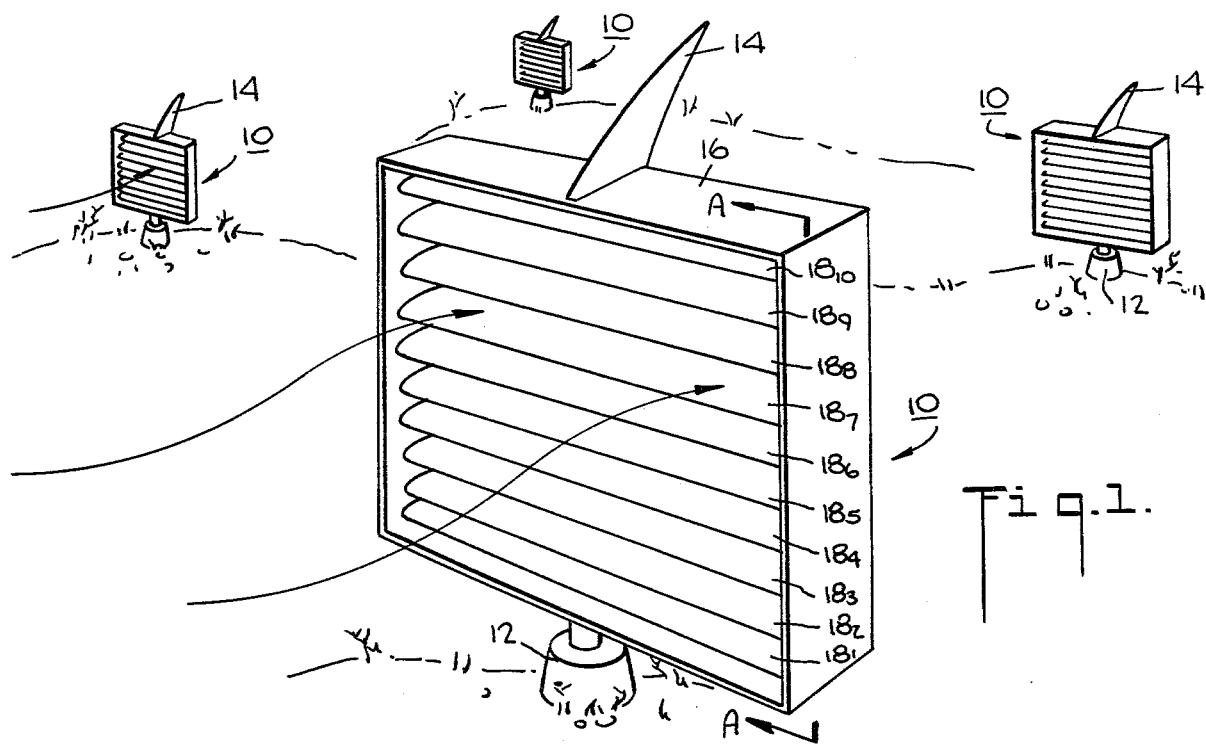
FIG. 1 is a perspective view of a plurality of energy converters each including a cascade of airfoils according to the present invention.

FIG. 1 shows a series of energy converters 10 according to the present invention and positioned in the wind. The energy converters 10 are pivotally mounted to supports 12 and assume directions transverse to the direction of the wind by means of vanes 14.

Each energy converter 10 includes a support structure 16 open at both ends to permit free passage of the wind therethrough and has a plurality of equally spaced thin airfoils $18_1 \ldots 18_{10}$ arranged within the support structure 16 at zero angle of attack when the airfoils are undisturbed. The uppermost and lowermost airfoils are spaced from the adjacent walls of the support structure by a distance equal to one half the distance between adjacent airfoils. As will be explained below, the airfoils are mounted so that when they are disturbed under conditions which induce flutter oscillations, adjacent airfoils oscillate substantially 180° out of phase and this oscillatory movement is then utilized to produce useful work.

Each airfoil preferably has a rounded leading edge and a sharp trailing edge, has a large aspect ratio, has a symmetrical profile, i.e. has zero camber to reduce the lift force, and is rectangular in plan form.

While a cascade of ten airfoils is shown, it should be understood that the number of airfoils arranged in a cascade may vary depending on the intended use of the device. In addition, while the airfoils have been illustrated as being stacked vertically to form the cascade, they may be stacked in any direction as long as they are normally at zero angle of attack when undisturbed without departing from the scope of the invention.

The present invention utilizes the phenomenon of the self-excited feedback associated with the unsteady aeroelastic phenomenon commonly known as aircraft wing flutter. This phenomenon involves the interaction of the elastic, inertia and dissipative forces of the airfoil with the unsteady aerodynamic forces resulting from the movement of an airfoil in a fluid stream. As the airfoil oscillates in pitch (angular rotation $\alpha$) and plunge (translational movement h), there results a complex generation of alternating vortices from the trailing edge which in turn form a trailing wake. The vorticity of the wake then feeds back to the airfoil to introduce a force and movement having components of plus or minus 90° out of phase with the airfoil motion. This 90° out of phase component introduces an apparent damping to the airfoil. At a critical velocity ($V_c$), this aerodynamic damping component becomes negative and balances the positive mechanical damping of the oscillating airfoil, to provide harmonic oscillations of the airfoil. However, at velocities above this critical velocity, increases in aerodynamic energy produce great instability and eventually the aerodynamic energy becomes so great that the airfoil is destroyed.

Much study has been done on the flutter phenomenon. While the vast amount of energy available during flutter has long been recognized, research has been directed solely to avoiding its disastrous consequences since during aircraft flight such flutter oscillations cannot be controlled but instead continue to build until the aircraft wing is eventually destroyed. The present invention, however, is able to utilize the flutter phenomenon because there is provided a control system which prevents the instability and destruction which normally result in wing flutter situations.

The use of a cascade provides a distinct advantage over a single airfoil subjected to flutter. It can be shown that for a particular set of parameters, the critical velocity needed to oscillate a cascade is less than that for a single airfoil. Furthermore, when the airfoils are arranged so that adjacent airfoils oscillate 180° out of phase, the critical velocity for a particular set of parameters will be the lowest possible.

Figure 2:
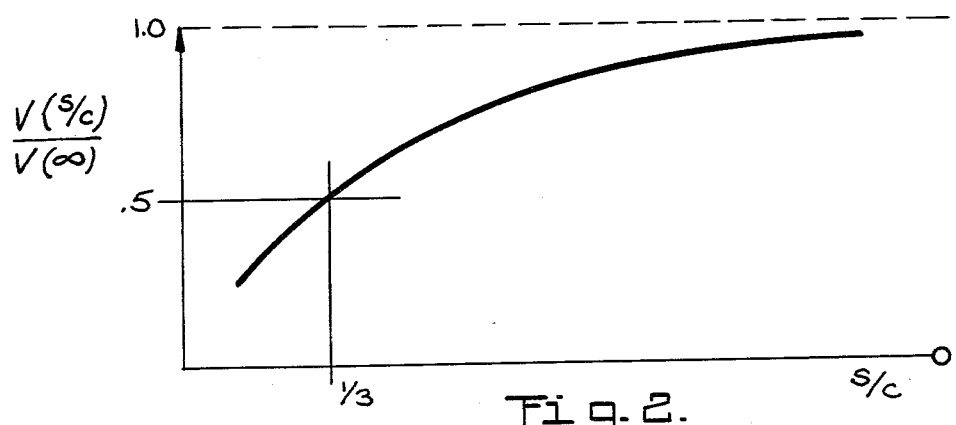
FIG. 2 is a graph illustrating that, for a given set of parameters, the critical velocity needed to induce flutter oscillations is less for a cascade of airfoils than for a single airfoil.

FIG. 2 is a graph illustrating advantage of the cascade. The ordinate is a non-dimensional ratio of the critical velocity for a cascade V(s/c) where adjacent airfoils oscillate 180° out of phase to the critical velocity for a single airfoil V(∞). The parameter s/c defines the spacing of airfoils arranged in a cascade where s is the distance between adjacent airfoils and c is the chord, (see FIG. 4). This parameter forms the abscissa in FIG. 2. For a particular set of parameters, it can be seen that where s/c is about $\frac{1}{8}$, the critical velocity for a cascade is about $\frac{1}{2}$ that needed to produce flutter in the case of a single airfoil. Accordingly by using a cascade for the absorption of energy due to the flutter phenomenon, flutter can be achieved at much lower velocities than with a single airfoil. In fact, by controlling the various parameters as will be explained hereinafter, the critical velocity needed to induce harmonic oscillations can be as low as 1 m.p.h.

Figure 3:
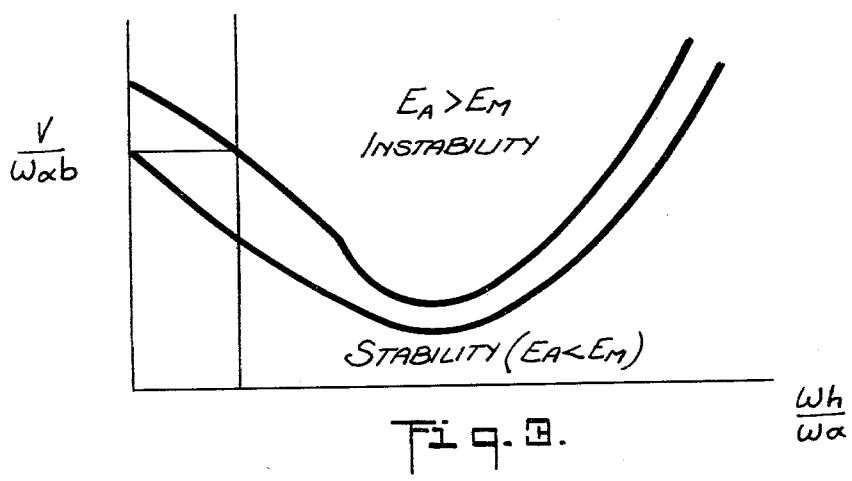
FIG. 3 is a graph illustrating how energy can be recovered by introducing a utility device into a system subject to flutter oscillations.

FIG. 3 is a graph illustrating the advantages of incorporating a utility device such as an electrical network into an oscillating cascade. The ordinate is a non-dimensional flutter speed (V/$\omega_\alpha$·b) where V is the velocity, $\omega_\alpha$ is the natural vibration frequency associated with pure pitch when V=0 and b is the airfoil semi-chord. The abscissa is the ratio of $\omega_h$ to $\omega_\alpha$, the natural frequency associated with pure plunge when V=0. The region below each curve defines the region of stability where the aerodynamic energy $E_A$ is less than the mechanical energy $E_M$. For a given set of values $\omega_h$ and $\omega_\alpha$, the critical velocity $V_c$ can be derived. Above each curve, which represents the critical velocity $V_c$, $E_A$ is greater than $E_M$ and, accordingly, defines a region of instability. The lower curve represents the critical velocity for a single airfoil while the upper curve represents the critical velocity where a utility device is incorporated into the system. This graph then illustrates that by adding a utility device, the aerodynamic energy which would otherwise cause the system to enter the unstable region is instead absorbed by the utility device while the system remains in the stable region. In the case of a cascade, since critical velocity is lower for a particular set of parameters, the associated curves will, of course, be lower than those shown in FIG. 3 for the single airfoil.

FIGS. 4 and 5 illustrate the harmonic oscillations which result when a cascade of airfoils is subjected to fluid flow at critical velocity, i.e. at flutter. In FIG. 4, the airfoils are at zero angle of attack prior to being disturbed. Even though the wind velocity is at the critical level, there is no movement of the airfoils due to their symmetrical contour. However, as soon as the system is disturbed by moving at least one of the airfoils, the flow field has the effect of coupling adjacent airfoils so that they begin to oscillate approximately 180° out of phase as shown schematically in FIG. 5. This oscillatory movement, which occurs at critical velocity, was first observed during studies of the adverse effects of flutter on rotating compressor blades.

Turning to FIG. 6, there is shown a first embodiment for mounting the airfoils of the present invention within the support structure 16 to permit the substantially 180° out of phase oscillations produced at flutter.

In order to facilitate understanding of the invention, only four of the ten airfoils shown in FIG. 1 are depicted in FIG. 6, namely, airfoils $18_4$–$18_7$ although all of the airfoils will be referred to hereinafter. As shown, the airfoils are arranged to define two subsystems, the odd numbered airfoils $18_1$, $18_3$, $18_5$, $18_7$ and $18_9$ defining a first subsystem and the even numbered airfoils $18_2$, $18_4$, $18_6$, $18_8$ and $18_{10}$ defining a second subsystem. The airfoils of each subsystem are interconnected to move in phase while each airfoil has at least two degrees of freedom since at least two degrees of freedom are required to induce flutter oscillations.

For the first subsystem, a pair of horizontal bars 20a, 20b are mounted to the bottom wall 22 of the support structure by springs 23a, 23b, while a second pair of horizontal bars 24a, 24b are mounted by springs 25a, 25b to the upper wall 26 of support structure 16. A pair of rods 28a, 28b extend between bars 20a and 24a and 20b and 24b, respectively, and are pivotally connected at 29a, 29b to the leading edge of each odd numbered airfoil. A similar pair of rods 30a, 30b extend between bars 20a, 24a and 20b, 24b respectively, and are pivotally connected at 31a, 31b to the trailing edge of each odd numbered airfoil. Rods 28a, 28b, 30a and 30b are connected to be slidable along their associated horizontal bars in order to accommodate limited pitching movement of the interconnected odd numbered airfoils without binding. Stops 32a, 32b are also provided to limit the amount of movement of this subsystem. Accordingly, with this mounting arrangement, a limited amount of pitch and plunge is permitted for the airfoils of the first subsystem.

The second subsystem is connected to the support structure 16 in a similar fashion. Thus, horizontal bars 34a, 34b and 36a, 36b are supported respectively by springs 37a, 37b, 38a, 38b and are interconnected by rods 40a, 40b and 42a, 42b, which are pivotally connected at 43a, 43b and 44a, 44b to the leading and trailing edges respectively of the even numbered airfoils. Rods 43a, 43b, 44a, 44b are connected to their associated horizontal bars to permit limited pitching movement. Finally, stops 45a, 45b are also provided to limit the movement of the even numbered airfoils.

From the foregoing, it will be apparent that the two subsystems are free to oscillate in pitch and plunge relative to each other and that when the energy converting device 10 is subjected to the wind at a critical velocity, the adjacent airfoils will oscillate approximately 180° out of phase as shown in FIG. 5. Thus the critical velocity will be the lowest possible for a particular set of parameters.

Since it is necessary to disturb the airfoils in order to achieve the desired harmonic oscillations, at least one mechanical oscillator is provided for one of the subsystems. In the embodiment of FIG. 6, oscillators 46 are provided for each subsystem with an oscillator at the forward and rearward end of each horizontal bar 20a, 20b, 34a, 34b. The forward and rearward oscillators for each subsystem are operated 180° out of phase. Similarly the corresponding oscillators for each subsystem are also oscillated 180° out of phase. In addition to providing the initial disturbance, operation of these oscillators maintains and enhances the oscillatory movement. Thus if the wind should die down to a velocity which is too low for the control system, which will be explained below, to maintain the system at critical velocity, the mechanical oscillators will keep the airfoils oscillating, until the velocity increases sufficiently to reestablish flow at critical velocity.

With the present invention, the natural velocity of the wind is used as the critical velocity. Accordingly, in order for this velocity to induce flutter oscillations, one or more parameters of the system, which includes the energy converter and the wind, must be varied. Furthermore, because the velocity of the wind may vary with time, these parameters must be varied in response to changes in velocity so that the prevailing velocity will maintain the oscillations.

To vary the parameters of the energy converter 10 in accordance with the wind velocity, there is provided a control system which includes a detector (not shown) such as an anemometer for detecting wind velocity or one which detects the amplitude of the oscillations. A signal from this detector is fed back to the energy converter 10 to vary at least one parameter thereof. Since critical velocity depends on the rigidity of the airfoils and the location of the center of gravity, these parameters can be varied by varying the spring stiffness or by moving a movable mass. In the present embodiment, a plurality of movable masses M are mounted along bars 20a, 20b, 34a, 34b. These masses are movable along their respective bars to adjust the system until the prevailing wind velocity is the critical velocity for the system. Thereafter, in response to the detection signals, these masses are movable to adjust the system so that the velocity remains critical and the oscillations continue. Alternatively, the stiffness of the springs supporting the horizontal bars, the frequency or amplitude of the oscillations by the mechanical oscillators or a parameter associated with a utility device, for example, the resistance in an electrical network, can be varied.

While in the foregoing, the parameters associated with the energy converter are controlled, it is also within the scope of the invention to control fluctuations in wind velocity so that a constant velocity is continuously applied to the airfoils.

FIGS. 7–9 show a utility device for converting the oscillatory movement of the airfoils into useful work. In these figures an electrical network is incorporated into the system to produce alternating current from the oscillatory movement. Each airfoil is provided with an electrical coil 41 and a magnet 47 attached to the sidewall 23 of the support structure 16. As the airfoils oscillate, alternating electrical current is induced in the coils 41. However, it is also within the scope of the present invention to position the magnets 47 on the airfoils while attaching the coils 41 on the sidewall 23.

Alternatively, since the airfoils of each subsystem are mechanically interconnected, the energy absorbed by each airfoil of a subsystem can be transferred to a single utility device. For example, a single electrical network can be connected to each subsystem. Thus a magnet 47 or coil 41 can be connected to one of the horizontal bars associated with each subsystem with the other element connected to the adjacent wall of the support structure 16. The advantage of this construction is that the electrical networks are spaced from the oscillating airfoils and cannot substantially affect the flow pattern past the airfoils.

The oscillatory movement of the airfoils caused by the wind can also be utilized to do other types of useful work such as, for example, operating a pump.

FIG. 10 illustrates a second embodiment of an energy converter 10 according to the present invention with similar reference numerals designating similar elements. Unlike the embodiment of FIG. 6 where the two subsystems are interconnected only through the oppositely applied outputs of oscillators 46, in the present embodiment the subsystems are mechanically interconnected to assure that they always operate 180° out of phase. Connecting bars 48a, 49a, pivotally interconnect horizontal bars 20a and 34a, and are also pivotally connected to the bottom wall 22 by pivot pins 50a, 51a while connecting bars 48b, 49b pivotally interconnect horizontal bars 20b, 34b and are pivotally connected to bottom wall 22 through pivot pins 50b, 51b. At the upper end of the energy converter, connecting bars 52a, 53a pivotally interconnect horizontal bars 24a and 36a and are pivotally connected to the upper wall 26 at 54a and 55a, respectively, while connecting bars 52b, 53b pivotally interconnect horizontal bars 24b and 36b and are pivotally connected to the upper wall 26 at 54b and 55b, respectively. The pivotal connections must be such as to permit the limited pitching and plunging movement at flutter. From the foregoing, it will be apparent that in the embodiment of FIG. 10, the two subsystems are mechanically interconnected to move 180° out of phase. With such an arrangement the airfoils cannot diverge from the ideal, out-of-phase oscillatory motion depicted in FIG. 5.

A further embodiment is disclosed in FIGS. 11 and 12 wherein similar reference numerals are used to identify similar elements. While in the previous embodiments, the airfoils are freely movable in pitch and plunge, in the instant embodiment the airfoils are only movable in pitch while separate flaps $56_1 \ldots 56_{10}$ are pivotally connected to the respective airfoils $18_1 \ldots 18_{10}$ to provide the second degree of freedom.

Each airfoil is provided with pins 58a and 58b at opposite ends for mounting the airfoils to the sidewalls of the support structure 16. These pins permit pitching movement and also support the airfoils to prevent plunging movement. Since the rods do not support the airfoils in this embodiment, a single set of rods, adjacent one side of the energy converter is sufficient to interconnect each subsystem. Thus horizontal bars 60, 62 are supported by springs 64, 66 and are interconnected by rods 68 and 70 which are pivotally connected at 72 and 74 to the leading and trailing edges of the even numbered airfoils. Stops 76 and 78 are provided to limit the amount of pitching movement.

Similarly, on the other side of the energy converter 10, horizontal bars 80 and 82 are supported by springs 64 and 66 and are interconnected by rods 84 and 86 which are pivotally connected at 88 and 90 to the leading and trailing edges of the odd numbered airfoils. Stops 76 and 78 are also provided for this subsystem. Of course, the subsystems may also be interconnected mechanically as in the embodiment of FIG. 10.

Each flap $56_1 \ldots 56_{10}$ is pivotally connected to its associated airfoil. While the flaps are spring biased to assume the position shown in FIG. 12, they may be moved in directions B-C due to the aerodynamic effects of the fluid stream as the airfoil oscillates in pitch in directions D-E.

FIG. 13 illustrates yet another embodiment of the present invention with similar reference numerals used for similar elements. In the foregoing embodiments, the energy converter 10 has included two subsystems of airfoils which move substantially 180° out of phase. It can be shown that a single airfoil which is equally spaced between a pair of flat plates when in an undisturbed state acts as an infinite cascade. This will be apparent from the following.

In the case of two subsystems oscillating 180° out of phase, with adjacent airfoils spaced apart by a distance s, the fluid is undisturbed at s/2. The same type of flow results if, instead of a cascade of airfoils, a flat plate is positioned at s/2 both above and below the airfoil.

In FIG. 13, there is provided a cascade of airfoils $18_1$ ... $18_{10}$ equally spaced apart by the distance s. While not shown, it will be apparent that airfoil $18_1$ is spaced from the bottom wall 22 by a distance s/2 while airfoil $18_{10}$ is spaced from upper wall 26 by distance s/2. Flat plates 92 are positioned halfway between the airfoils in the undisturbed state, i.e. s/2 and the airfoils are pivotally interconnected at 94, 96 to rods 98a, 98b, 99a, 99b, which in turn are connected for limited sliding movement to horizontal bars 100a, 100b, 102a, 102b. As in the previous embodiments, the horizontal bars are spaced from the upper and bottom walls of support structure 16 by springs 103.

It will be apparent that each bounded airfoil acts as an infinite cascade, i.e. has the lowest possible critical velocity for a particular set of parameters. In addition, since the airfoils are interconnected to move in phase in both pitch and plunge through the rods 98a, 98b, 99a, 99b, the energy absorbed by each airfoil may be applied to a single utility device.

While not illustrated, the embodiments of FIGS. 10, 12 and 13 are also provided with means for adjusting the parameters of the system such as movable masses M, a control system responsive to changes in fluid velocity and mechanical oscillators 46 to maintain and enhance the flutter oscillations.

Similarly it will be appreciated that all of the foregoing embodiments may be constructed to permit three or more degrees of freedom since the invention is not intended to be limited to only two degrees of freedom. For example, flaps may be provided in combination with airfoils which are freely movable in both pitch and plunge to provide an energy converter 10 having three degrees of freedom.

In operation, the energy converter 10 is positioned at a location where it will be subject to the action of the wind. Thereafter, based on the velocity of the wind, various parameters are adjusted so that the wind velocity will be a critical velocity for the system. Then, at least one airfoil is disturbed to initiate harmonic oscillations and the utility device harnesses the energy from the wind and converts it into useful work such as the production of alternating current or pumping action. Because a control system is provided, variations in the velocity of the wind will be detected and the energy converter will be automatically adjusted so that the prevailing velocity continues to cause harmonic oscillations due to flutter.

While the energy converter 10 is shown as being positioned in the wind, the present invention is also directed to a method and apparatus wherein the moving fluid is a liquid such as water.

Thus far the invention has been disclosed as including a cascade of airfoils driven solely by a moving fluid stream to do useful work. However, the cascade can also be mechanically oscillated so that the energy of the moving fluid stream is utilized to increase its own propulsion.

In 1936, I. E. Garrick reported that by oscillating a single airfoil in a moving fluid, a negative drag is produced. FIG. 14 is a graph illustrating this phenomenon. The ordinate is the ratio of the average work done in unit time ($P_xV$) by the propulsive force to the average work done in unit time $\overline{W}$ to maintain the oscillations against the aerodynamic forces and pitching moment. The abscissa is a non-dimensional relationship $V/\omega b$ where V is the velocity, $\omega$ is the frequency of oscillation in pure plunge and b is the semi-chord. Curve 104 represents Garrick's findings for a single airfoil in pure plunge where s/c=$\infty$. The case of a cascade where s/c=$\frac{1}{2}$ is represented by curve 105.

By way of example, assume that V=10 ft/sec. b=$\frac{1}{2}$ ft, $\omega$=40 rad/sec. so that V/$\omega$b=0.5. From FIG. 14 it will be seen that for the single airfoil (s/c=$\infty$)($P_xV$)/$\overline{W}$=0.53 while for the cascade (s/c=$\frac{1}{2}$)($P_xV$)/$\overline{W}$=0.9. Thus by oscillating a cascade in a moving fluid stream, the efficiency of the propulsive energy derived will be 1.7 times that for a single airfoil.

Similar increases in efficiency can be achieved where the cascade is oscillated in pure pitch, a combination of pitch and plunge or where flaps are provided either alone or in combination with pitch and/or plunge.

Since the cascade is here being used only to assist in the propulsion of the fluid in which the cascade is positioned, flutter and critical velocity are not important factors.

FIG. 15 shows one embodiment for increasing the propulsion of a moving fluid stream. A cascade of airfoils 106 is arranged to define two subsystems within a fluid stream 108 which is being pumped through a conduit 109. The subsystems are oscillated 180° out of phase by two mechanical driving sources 110, 112 in pure plunge.

Driving source 110, 112 can be of any type. Thus it is within the scope of the present invention to use a fluid-driven cascade at flutter to produce mechanical movement for oscillating the airfoils. In such a construction a first cascade is provided in a first fluid stream maintained at critical velocity and the harmonic oscillations of the cascade are then used to oscillate a second cascade to thereby increase the propulsion of the second fluid stream.

FIG. 16 illustrates another embodiment of a device for increasing the propulsion of a moving fluid stream. As in the embodiment of FIG. 15, the fluid stream 108 is pumped through a conduit 109 and the airfoils are arranged in two subsystems, each responsive to one of two mechanical driving sources 110, 112 operating 180° out of phase. In this embodiment, each subsystem is oscillated in both pitch and plunge.

Since as stated above, a single airfoil equidistant from the opposite walls of a bounded fluid acts as an infinite cascade, a single airfoil can be oscillated in a bounded fluid to increase propulsion.

While the cascade of airfoils in FIGS. 15 and 16 are shown positioned within a bounded fluid, it is also within the scope of the invention to utilize such a cascade in a naturally flowing unbounded fluid stream, for example, a river or the wind.

Having thus described the invention with particular reference to the preferred forms thereof, it will be obvious to those skilled in the art to which the invention pertains, after understanding the invention, that various changes and modifications may be made therein without departing from the scope of the invention as defined by the claims appended hereto.

What is claimed is:

1. A method for converting the kinetic energy of a fluid stream into useful work comprising the steps of positioning a device including a pair of parallel plates and a thin airfoil equally spaced from each plate and having at least two degrees of freedom within a moving fluid stream with the plates parallel to the free stream and the airfoil at zero angle of attack when undisturbed to define an aerodynamic system, adjusting the system until the velocity of the fluid is sufficient to induce flutter oscillations, disturbing the airfoil, and then utilizing the resultant oscillations to produce useful work.

2. A method according to claim 1, wherein the oscillations of the airfoil are used to produce alternating current.

3. A method according to claim 1, wherein the oscillations of the airfoil are utilized to operate a pump.

4. A method according to claim 3, wherein the pump includes a cascade of airfoils in another fluid stream and wherein the oscillations of the airfoil are utilized to oscillate the second cascade.

5. A method according to claim 1, wherein the device includes a plurality of airfoils each having two degrees of freedom and arranged in a cascade and additional flat plates, wherein the airfoils are equally spaced from each other and from adjacent flat plates when the system is undisturbed.

6. A method according to claim 5, wherein the airfoils are interconnected to oscillate in phase.

7. A method according to claim 1, wherein the device includes means for adjusting the parameters associated with the device, and wherein said adjusting step includes operating said adjusting means.

8. A method according to claim 7, further including the step of controlling the operation of said adjusting means in response to variations in fluid velocity to maintain the system at critical velocity.

9. A method according to claim 1 further including the step of applying mechanical oscillations to the airfoils to maintain and enhance the flutter oscillations.

10. A method according to claim 1, wherein the resultant oscillations are utilized to oscillate another airfoil positioned in a bounded fluid stream in a direction having a component substantially perpendicular to the direction of fluid flow.

11. A method according to claim 10, wherein said airfoil is oscillated in plunge.

12. A method according to claim 11, wherein said airfoil is also oscillated in pitch.

13. A method according to claim 10, wherein a cascade of airfoils is positioned in the bounded fluid stream and adjacent airfoils are oscillated substantially 180° out of phase.

14. Apparatus for converting the kinetic energy of a fluid stream into useful work comprising a support structure open at opposite ends to permit fluid flow therethrough and including a plurality of equally spaced flat plates extending parallel to the direction of fluid flow, a plurality of airfoils, means for mounting said airfoils within said support structure in a cascade with each airfoil having at least two degrees of freedom and being equally spaced between adjacent flat plates at zero angle of attack when undisturbed, means interconnecting said airfoils to oscillate in phase, and means operatively associated with said airfoils to utilize the oscillatory movement thereof to produce useful work.

15. Apparatus according to claim 14, further including means for adjusting the conditions under which said airfoils will begin to oscillate.

16. Apparatus according to claim 15, wherein said adjusting means includes at least one movable mass mounted on said mounting means.

17. Apparatus according to claim 14, further including a control means for maintaining the oscillatory movement when the velocity of the fluid stream varies, said control means including a detector and feedback means for controlling said adjusting means in response to a detection signal.

18. Apparatus according to claim 17, wherein said detector includes means for detecting the amplitude of the airfoil oscillations.

19. Apparatus according to claim 17, wherein said detector includes an anemometer.

20. Apparatus according to claim 14, further including mechanical oscillating means to maintain and enhance the flutter oscillations.

21. Apparatus according to claim 14, wherein said airfoils have zero camber.

22. Apparatus according to claim 14, wherein said airfoils have a high aspect ratio and are rectangular in plan form.

23. Apparatus according to claim 14, further including means to disturb at least one of said airfoils.

24. Apparatus according to claim 14, further including a vane on said support structure and wherein said support structure is pivotally mounted upon a support within a fluid stream.

25. Apparatus according to claim 14 wherein said mounting means includes means enabling adjacent airfoils to oscillate freely in both pitch and plunge.

26. Apparatus according to claim 14, wherein each airfoil includes a pivotally mounted flap adjacent to its trailing edge.

27. Apparatus according to claim 26, wherein said mounting means includes means enabling adjacent airfoils to oscillate freely in plunge.

28. Apparatus according to claim 26, wherein said mounting means includes means enabling adjacent airfoils to oscillate freely in pitch.

29. Apparatus according to claim 14, wherein said utilizing means is an alternating current producing means.

30. Apparatus according to claim 14 wherein said utilizing means is a pump.

31. Apparatus according to claim 30, wherein said pump includes at least one airfoil positioned in another fluid stream which is movable in a direction having a component substantially perpendicular to the direction of fluid flow.

32. Apparatus according to claim 31, wherein said pump includes a cascade of airfoils.

33. Apparatus according to claim 32, wherein adjacent airfoils of said cascade are movable substantially 180° out of phase.

* * * * *